US012314729B2

United States Patent
Li et al.

(10) Patent No.: US 12,314,729 B2
(45) Date of Patent: May 27, 2025

(54) SIDEBAND BARE METAL PROVISIONING

(71) Applicant: Dell Products L.P., Round Rock, TX (US)

(72) Inventors: Tianhe Li, Shanghai (CN); Zhuo Zhang, Shanghai (CN); Lixia Hu, Shanghai (CN); Kai Zhou, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/963,830

(22) Filed: Oct. 11, 2022

(65) Prior Publication Data

US 2024/0103881 A1     Mar. 28, 2024

(30) Foreign Application Priority Data

Sep. 28, 2022   (CN) .......................... 202211193615.1

(51) Int. Cl.
*G06F 9/44*     (2018.01)
*G06F 9/4401*   (2018.01)

(52) U.S. Cl.
CPC ................................ *G06F 9/4406* (2013.01)

(58) Field of Classification Search
CPC .................................................... G06F 9/4406
See application file for complete search history.

(56) References Cited

U.S. PATENT DOCUMENTS

| 10,372,463 | B1 * | 8/2019 | Twomey | G06F 9/4406 |
| 2024/0020130 | A1 * | 1/2024 | Nadiminti | G06F 9/4406 |

* cited by examiner

Primary Examiner — Zahid Choudhury
(74) Attorney, Agent, or Firm — Jackson Walker L.L.P.

(57) ABSTRACT

Disclosed methods respond to detecting the receipt, by a management controller, such as a baseboard management controller (BMC), of an information handling system, of a provisioning request from a management client, by rebooting the information handling system to initiate a Universal Extensible Firmware Interface (UEFI) boot sequence that is configured to load an EFI application, referred to herein a provisioning application. A two way communication channel such as a WebSocket is established between the management client and the management controller to stream OS image data corresponding to an OS image to the management controller. The OS image data streamed to the management controller is written to an OS image partition of a boot device, after which the stored OS image may be booted to load the OS. The provisioning request may be communicated as a representational state transfer (REST) compliant (RESTful) request using, in at least some deployments, a Redfish application programming interface (API).

18 Claims, 2 Drawing Sheets

SIDEBAND BARE METAL PROVISIONING

TECHNICAL FIELD

The present disclosure relates to information handling systems and, more particularly, provisioning of information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Server class information handling systems may be implemented as bare metal servers, i.e., servers that employ a virtualization environment featuring a hypervisor that does not rely on a host operating system (OS) for its functionality. Provisioning a bare metal server in a modern datacenter raises numerous challenging issues including, as examples, flexibility, security, scalability, and multi-tenancy. While Universal Extensible Firmware Interface (UEFI) boot technology based on Hypertext transfer protocol (HTTP) improves and addresses issues raised by legacy but widely used Preboot Execution Environment (PXE) boot technology, it is still not a cloud-native approach and relies too heavily on an in-band network.

In contrast, cloud-ready images are used increasingly for both virtual machines (VMs) and physical (bare-metal) servers. Current in-band provisioning technologies, which are primarily intended for traditional OS deployments, lack efficient and native functionality to inject cloud image metadata over PXE boot or UEFI HTTP boot.

SUMMARY

Common problems associated with conventional provisioning approaches referenced above are addressed by disclosed systems and methods for provisioning an information handling system. In one aspect, disclosed methods respond to detecting the receipt, by a management controller, such as a baseboard management controller (BMC), of an information handling system, of a provisioning request from a management client, by rebooting the information handling system to initiate a UEFI boot sequence that is configured to load an EFI application, referred to herein a provisioning application. A two way communication channel such as a WebSocket is established between the management client and the management controller to stream OS image data corresponding to an OS image to the management controller. The OS image data streamed to the management controller is written to an OS image partition of a boot device, after which the stored OS image may be booted to load the OS. The provisioning request may be communicated as a representational state transfer (REST) compliant (RESTful) request using, in at least some deployments, a Redfish application programming interface (API).

Disclosed provisioning methods may route the streaming OS image to the boot device by opening a stream input on a predetermined transfer control protocol (TCP) port and dumping data received via the stream input to the boot device. A virtual network interface card (NIC) of the management controller may forward the OS image data received via the WebSocket to the predetermined TCP port, thereby rendering it unnecessary to store the typically enormous OS image in BMC storage resources. In addition, if the provisioning request incudes cloud image metadata, the metadata may be stored to a metadata partition of the boot device.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
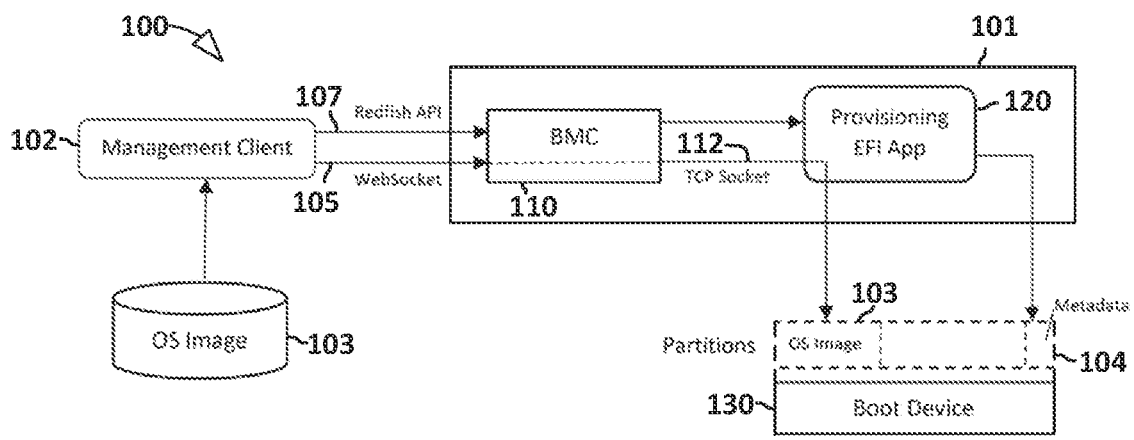
FIG. 1 illustrates a system diagram for implementing sideband bare metal provisioning in accordance with disclosed teachings.

Exemplary embodiments and their advantages are best understood by reference to FIGS. 1-4, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Referring now to the drawings, FIG. 1 illustrates an exemplary computing platform 100 including an information handling system 101 suitable for implementing sideband provisioning of bare metal servers in accordance with disclosed teachings. The illustrated computing platform 100 leverages HTTP-based Redfish functionality supported on at least some types of BMCs and extends that functionality by establishing a WebSocket between a remote management client and the BMC, streaming OS image data from the management client to the BMC via the WebSocket, and writing the streaming OS image data to a boot device from which the system can boot an operating system.

Figure 2:
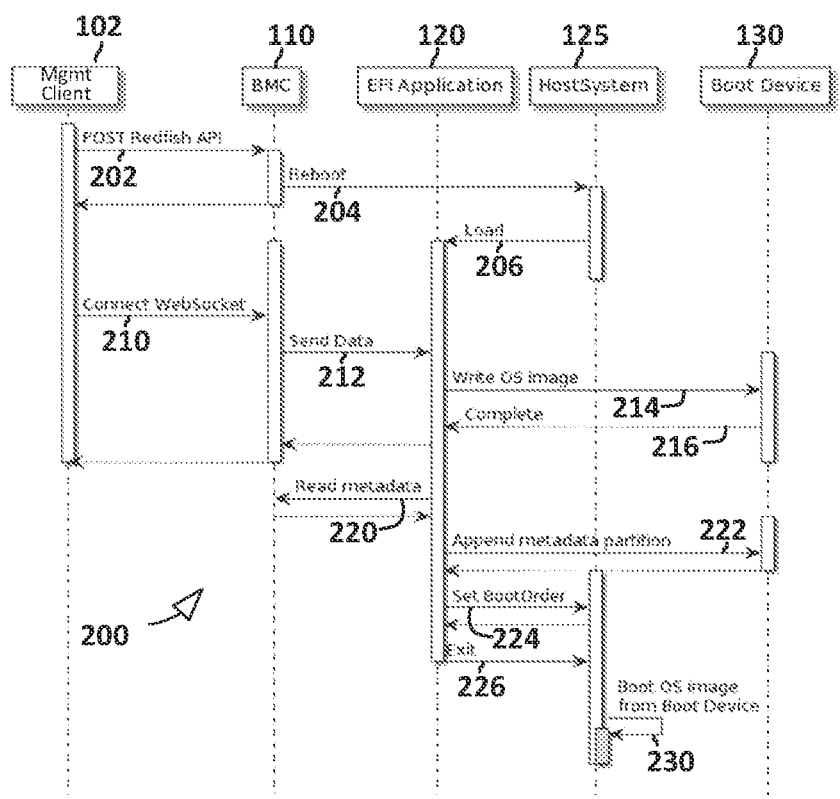
FIG. 2 illustrates a sequence for sideband bare metal provisioning in accordance with disclosed teachings.

As depicted in FIG. 1 and described in more detail with respect to FIG. 2, two communication channels have been established between management client 102 and BMC 110. The communication channels illustrated in FIG. 1 include an HTTP-based Redfish API connection 107 and a WebSocket 105. The Redfish API connection 107 may be used to initiate the bare metal provisioning operations while the WebSocket 105 may be used to stream or otherwise transmit OS image data from an OS image database 103 to a boot device 130. FIG. 1 further illustrates a TCP socket 112, established by provisioning application 120, between BMC 110 and boot device 130. In at least some embodiments, OS image data received by BMC 110 via WebSocket 105 may be forwarded to boot device 130 over a TCP socket 112. FIG. 1 still further illustrates provisioning application 120 sending metadata, e.g., cloud image metadata, to boot device 130. The boot device 130 illustrated in FIG. 1 includes two or more partitions including an OS image partition and a metadata partition 104.

Referring now to FIG. 2, a sequence diagram illustrates a method 200 for performing side band provisioning of bare metal servers in accordance with disclosed teachings. The participants in the illustrated sequence diagram include the management client 102, the BMC 110, the provisioning application 120, a host system 125, and the boot device 130. As depicted in FIG. 2, method 200 begins when the management client 102 sends (step 202) a provisioning request to BMC 110. The illustrated provisioning request is implemented as an HTTP request and, more specifically, a Redfish API POST request. BMC 110 may respond to receipt of the provisioning request by rebooting (operation 204) the information handling system. The boot sequence initiated by the reboot is, in at least one embodiment, a UEFI boot sequence that includes, as part of the sequence, the loading of provisioning application 120, indicated as step 206 in the illustrated embodiment.

As depicted in FIG. 2, the management client 102 establishes (step 210) a web socket connection with BMC 110. The management client 102 may then proceed to stream OS image data from the OS image database (depicted in FIG. 1) via the WebSocket 105 (FIG. 1). FIG. 2 further illustrates BMC 110 sending (step 212) the streamed OS image data to the provisioning application 120. Provisioning application 120 is illustrated writing (Step 214) the OS image data received from the BMC to the boot device 130. Steps 212 and 214 may proceed until the entire OS image has been written to boot device 130 at which point the process completes (step 216).

The method 200 illustrated in FIG. 2 further includes a meta-data portion during which metadata included in the provisioning request is stored to boot device 130. As depicted in FIG. 2, provisioning application 120 may read (operation 220) metadata from BMC 110 and then append (step 222) the metadata to a metadata partition 104 (depicted in FIG. 1). The illustrated method 200 may then set (step 224) a boot order before exiting (step 226). At this point, the information handling system may boot (step 230) the OS image from the boot device to load an operating system.

The BMC may respond to receiving a provisioning request from the remote management client by rebooting the information handling system to execute a UEFI boot process. After performing power on self-test (POST) and an initialization, the boot sequence loads an Extensible Firmware Interface (EFI) application referred to herein as provisioning application 120, which may wait to detect stream input from BMC 110. As depicted in FIG. 1, BMC 110 may forward OS image data received by the BMC 110 illustrated in FIG. 2 and establish a communication channel, identified as TCP socket 112, with a boot device 130. Provisioning application 120 is illustrated forwarding information received by BMC 110 via WebSocket 105 to boot device 130. In the depicted embodiment, the management client 102 is accessing OS image data 103 and providing the OS image data to the device 130 via BMC 110 and EFI provisioning application 120.

Figure 3:
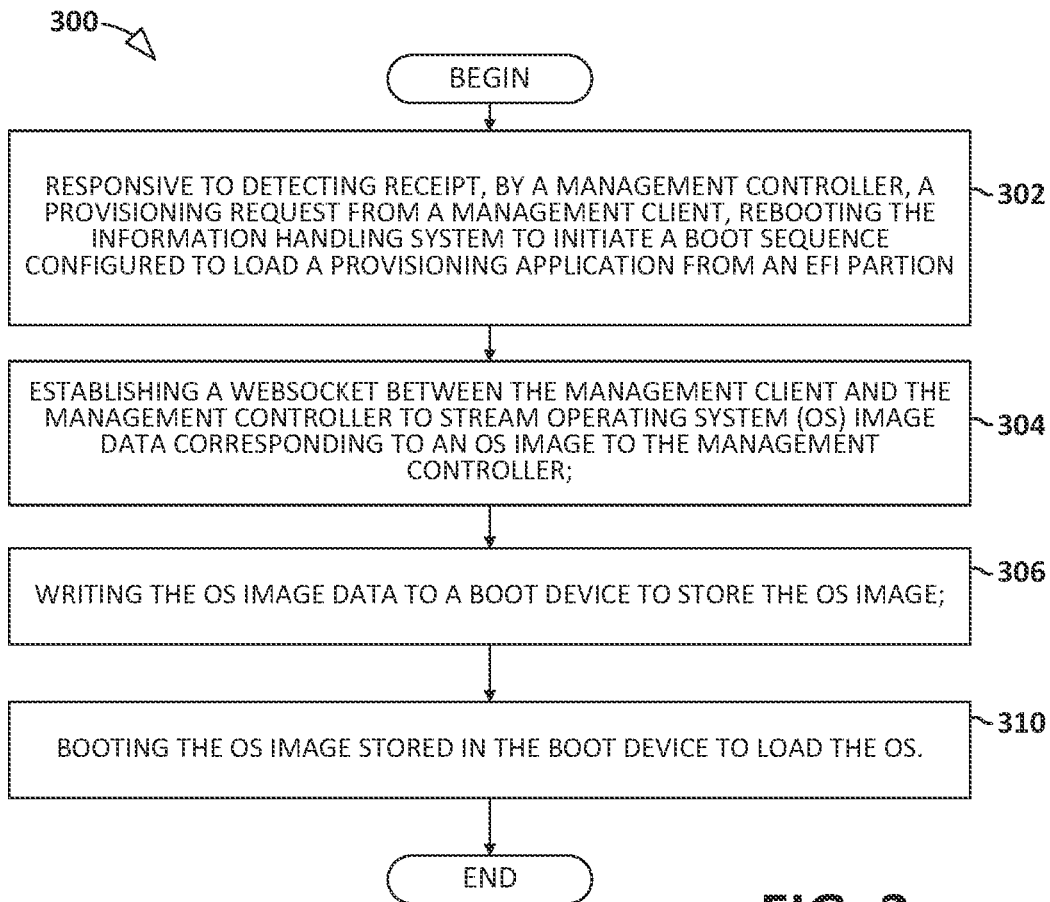
FIG. 3 illustrates a flow diagram of a bare metal provisioning method in accordance with disclosed teachings.

Referring now to FIG. 3, a flow diagram illustrates a sideband provisioning method 300 for bare metal servers. As illustrated in FIG. 3, method 300 may include, responsive to detecting (step 302) receipt, by a management controller of the information handling system, of a provisioning request from a remote management client, rebooting the information handling system to initiate a boot sequence configured to load a provisioning application. The illustrated method further includes establishing (step 304) a WebSocket between the management client and the management controller to stream OS image data corresponding to an OS image to the management controller. The OS image data may then be written (step 306) or dumped to a partition in boot device 130. With the OS image now stored in the boot device, the system may boot (step 310) the OS image to load the OS.

Figure 4:
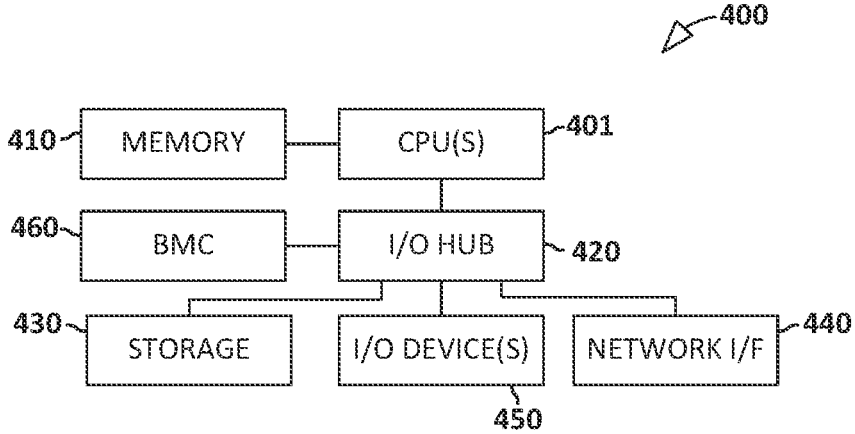
FIG. 4 illustrates an exemplary information handling system suitable for use in conjunction with disclosed teachings.

Referring now to FIG. 4, any one or more of the elements illustrated in FIG. 1 through FIG. 3 may be implemented as or within an information handling system exemplified by the information handling system 400 illustrated in FIG. 4. The illustrated information handling system includes one or more general purpose processors or central processing units (CPUs) 401 communicatively coupled to a memory resource 410 and to an input/output hub 420 to which various I/O resources and/or components are communicatively coupled. The I/O resources explicitly depicted in FIG. 4 include a network interface 440, commonly referred to as a NIC (network interface card), storage resources 430, and additional I/O devices, components, or resources 450 including as non-limiting examples, keyboards, mice, displays, printers, speakers, microphones, etc. The illustrated information handling system 400 includes a baseboard management controller (BMC) 460 providing, among other features and services, an out-of-band management resource which may be coupled to a management server (not depicted). In at least some embodiments, BMC 460 may manage information handling system 400 even when information handling system 400 is powered off or powered to a standby state. BMC 460 may include a processor, memory, an out-of-band network interface separate from and physically isolated from an in-band network interface of information handling system 400, and/or other embedded information handling resources. In certain embodiments, BMC 460 may include or may be an integral part of a remote access controller (e.g., a Dell Remote Access Controller or Integrated Dell Remote Access Controller) or a chassis management controller.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method for provisioning an information handling system, wherein the method comprises:
   responsive to detecting receipt, by a management controller of the information handling system, of a provisioning request from a management client, rebooting the information handling system to initiate a boot sequence configured to load a provisioning application;
   streaming operating system (OS) image data to the management controller over a WebSocket established between the management client and the management controller;
   forwarding the OS image data received by the management controller via the WebSocket to a boot device via a transfer communication protocol (TCP) socket between the management controller and the boot device;
   storing an OS image corresponding to the OS image data to the boot device; and
   booting the OS image stored in the boot device to load the OS.

2. The method of claim 1, wherein the management controller comprises a baseboard management controller (BMC).

3. The method of claim 1, wherein the provisioning request comprises a representational state transfer (REST) compliant (RESTful) provisioning request.

4. The method of claim 3, wherein the RESTful provisioning request is a POST Redfish API request.

5. The method of claim 1, wherein said forwarding of the OS image data to the boot device via the TCP socket includes:
   opening a stream input on a predetermined TCP port; and
   forwarding data received via the stream input to the TCP port.

6. The method of claim 1, wherein forwarding the OS image data received via the WebSocket to the TCP port comprises forwarding the OS image data via a virtual network interface card (NIC) device.

7. The method of claim 1, wherein the provisioning application comprises an Extensible Firmware Interface (EFI) application.

8. The method of claim 1, wherein storing the OS image comprises storing the OS image to an OS partition of the boot device.

9. The method of claim 8, further comprising:
responsive to detecting cloud image metadata in the provisioning request, appending a metadata partition to the boot device and storing the cloud image metadata in the metadata partition.

10. An information handling system, comprising:
a central processing unit (CPU); and
a computer readable memory, accessible to the CPU, including executable instructions that, when executed by the CPU, cause the CPU to perform operations comprising:
responsive to detecting receipt, by a management controller of the information handling system, of a provisioning request from a management client, rebooting the information handling system to initiate a boot sequence configured to load a provisioning application;
streaming operating system (OS) image data to the management controller over a WebSocket established between the management client and the management controller;
forwarding the OS image data received by the management controller via the WebSocket to a boot device via a transfer communication protocol (TCP) socket between the management controller and the boot device;
storing an OS image corresponding to the OS image data to the boot device; and
booting the OS image stored in the boot device to load the OS.

11. The information handling system of claim 10, wherein the management controller comprises a baseboard management controller (BMC).

12. The information handling system of claim 10, wherein the provisioning request comprises a representational state transfer (REST) compliant (RESTful) provisioning request.

13. The information handling system of claim 12, wherein the RESTful provisioning request is a POST Redfish API request.

14. The information handling system of claim 10, further comprising:
opening a stream input on a predetermined TCP port; and
forwarding data received via the stream input to the TCP port.

15. The information handling system of claim 14, wherein forwarding the OS image data received via the WebSocket to the TCP port comprises forwarding the OS image data via a virtual network interface card (NIC) device.

16. The information handling system of claim 10, wherein the provisioning application comprises an Extensible Firmware Interface (EFI) application.

17. The information handling system of claim 10, wherein storing the OS image comprises storing the OS image data to an OS partition of the boot device.

18. The information handling system of claim 17, further comprising:
responsive to detecting cloud image metadata in the provisioning request, appending a metadata partition to the boot device and storing the cloud image metadata in the metadata partition.

* * * * *